United States Patent [19]

Kasai

[11] 4,422,628
[45] Dec. 27, 1983

[54] CLAMPING APPARATUS

[75] Inventor: Shigeo Kasai, Sagamihara, Japan

[73] Assignee: Amada Company, Limited, Japan

[21] Appl. No.: 305,336

[22] Filed: Sep. 24, 1981

[30] Foreign Application Priority Data

Sep. 24, 1980 [JP] Japan .................................. 55-131485

[51] Int. Cl.³ .............................................. B23Q 1/04
[52] U.S. Cl. ...................................... 269/71; 269/239;
83/277; 83/458; 83/459; 83/410; 83/412
[58] Field of Search ................. 83/277, 458, 459, 461,
83/71, 410, 412–413; 269/55, 56, 58, 71, 75,
237–239

[56] References Cited

U.S. PATENT DOCUMENTS 3,595,112 7/1971 DeGeorge et al. .
3,835,743 9/1974 Taylor et al. .
3,839,936 10/1974 Daniels .................................. 83/410
4,143,571 3/1979 Oxenham .............................. 83/412

Primary Examiner—Robert C. Watson
Attorney, Agent, or Firm—Wigman & Cohen

[57] ABSTRACT

A workpiece clamping apparatus for machine tools comprises a frame; a rocking sleeve member, rockably fixed to the frame; a cylindrical member, slidably inserted in the rocking sleeve member, so as to move therein; a rod member, inserted in the cylindrical member, so as to project therefrom; a swinging holding member, rockably provided at one end of the rod member; and an upper clamping jaw and a lower clamping jaw, both connected to the swinging holding member, for gripping an end of a workpiece.

2 Claims, 5 Drawing Figures

CLAMPING APPARATUS

BACKGROUND OF THE INVENTION

1. Field of the Invention

The present invention relates generally to a machine tools such as punch presses and laser processing machines and more particularly pertains to clamping apparatus for clamping materials to be processed such as sheet materials in machine tools, e.g., punch presses, laser processing machines and drilling machines.

2. Description of the Prior Art

The prior art concerning the present invention will be described, by way of example, about what is called a turret punch press which has turrets for holding a number of tools to process sheet materials such as sheet metals, although the present invention is applicable not only to punch presses other than turret punch presses but also to other machine tools such as laser processing machines.

As is well known, the turret punch press is used to punch a number of holes on sheet materials such as sheet metals as its name implies, and it is also used to form a variety of shapes such as flanges and louvers on sheet materials or form or bend sheet materials into shapes. The turret punch press comprises a vertically movable ram and a pair of rotatable upper and lower turrets for holding a plurality of upper and lower tools which are varied in size and shape to punch and form a variety of holes and shapes in sheet materials such as sheet metals. The upper and lower turrets are vertically spaced from each other substantially beneath the ram and horizontally disposed on their respective shafts which are vertically disposed so as to coaxially align with each other. Each of the upper tools on the upper turret is so located as to vertically align with either of the lower tools on the lower turret to cooperate with each other to punch holes of a peculiar shape or form shapes of a peculiar configuration. Also, the upper and lower turrets are so arranged as to be simultaneously rotated by power to bring a desired pair of the upper and lower tools into a position just beneath the ram so as to enable them to be worked by the ram to punch holes of a desired shape or form shapes of a desired configuration. In this arrangement, a workpiece such as a sheet metal to be punched and/or formed is horizontally fed by a plurality (usually a pair) of clamping means into a position between the upper and lower turrets, namely the upper and lower tools which have been placed just beneath the ram by the upper and lower turrets. The clamping means are so arranged as to grip an end of the workpiece and be moved by power in all directions toward and away from the upper and lower turrets to bring any portion of the workpiece into a position between a desired pair of the upper and lower tools beneath the ram. Also, in order to automatically and continuously punch and form a number of holes and shapes varied in size and shape in the workpiece, the upper and lower turrets and the clamping means are so arranged as to be rotated and moved under a numerical control which is preprogrammed.

In the conventional turret punch press of the above described arrangement, it has been disadvantageous that the clamping means for clamping the workpiece will often inevitably go into collision with any of the lower tools on the lower turret. The clamping means will collide with any of the lower tools when it is moving in the proximity of the upper and lower turrets to place just beneath the ram a portion of the workpiece close to the clamped end thereof. Since the clamping means is moved by power at high speed, the clamping means and the lower tools will suffer from great shock which will shorten their lives and decrease the punching accuracy, when they collide with each other. Accordingly, it has been desired to decrease the shock which is caused by the collision of the clamping means and the lower tools especially in order to move the clamping means at higher speed to perform operations at higher speed.

As another conventional disadvantage with regard to the turret punch press, workpieces such as sheet metals to be punched and/or formed are often originally bent or warped and also will become bent or warped upwardly away from the horizontal level when continuously punched and/or punched to have a number of holes and/or shapes punched and/or formed. Accordingly, it has been desired that the clamping means cope with the bends or warps of workpieces being punched and/or formed in order to perform accurate punching and/or forming operations without hurting the workpieces.

As a further conventional disadvantage with regard to the turret punch press, the clamping means has been so arranged that clamping members can move to grip the workpiece to be punched and/or formed only along the feeding level where the workpiece is to be fed into between the upper and lower turrets. In fact, the end of the workpiece which is to be gripped by the clamping members will bend down more or less lower than the feeding level, since the workpiece is of a thin sheet material. Therefore, the clamping means in the conventional turret punch press cannot moderately grip the workpiece, and the clamping means and workpiece will be often hurted.

A further conventional disadvantage with regard to the turret punch press has been that the clamping means will be pulled or pushed by the workpiece or suffer from shock caused by side thrust force especially when forming operations are being performed by the upper and lower tools to form shapes such as flanges and louvers. The side thrust force will occur especially when forming operations are being performed, since in forming operations the workpiece is placed aslant on the lower tool. Of course, the shock caused by the side thrust force will shorten the life of the clamping means and also will decrease the processing accuracy of the turret punch press.

SUMMARY OF THE INVENTION

It is a general object of the present invention to provide a clamping apparatus which can resiliently move to feed and position a workpiece to be processed in machine tools such as punching presses, processing machines and drilling machines.

It is therefore a specific object of the present invention to provide a clamping apparatus which can resiliently move against or cope with an obstacle with little shock to feed and position a workpiece to be processed in machine tools.

It is another specific object of the present invention to provide a clamping apparatus which can resiliently cope with the state of a workpiece to be processed to feed and position the workpiece in machine tools.

It is another object of the present invention to provide a clamping apparatus which can resiliently cope with side thrust force occurring during operations and causing a workpiece being processed to pull or push the clamping apparatus in machine tools.

It is a further object of the present invention to provide a clamping apparatus in which clamping members will go to grip workpiece to be processed initially along a lower level than a feeding level and then will be raised to the feeding level to feed the workpiece.

It is therefore another object of the present invention to provide a clamping apparatus for machine tools which can stand long use.

It is a further object of the present invention to provide a clamping apparatus for machine tools which will enable workpieces to be processed with a high degree of accuracy.

According to the present invention, basically these objects are accomplished by so arranging clamping members for clamping the workpiece as to resiliently swing and resiliently vertically move in the clamping apparatus when feeding and positioning the workpiece in machine tools.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
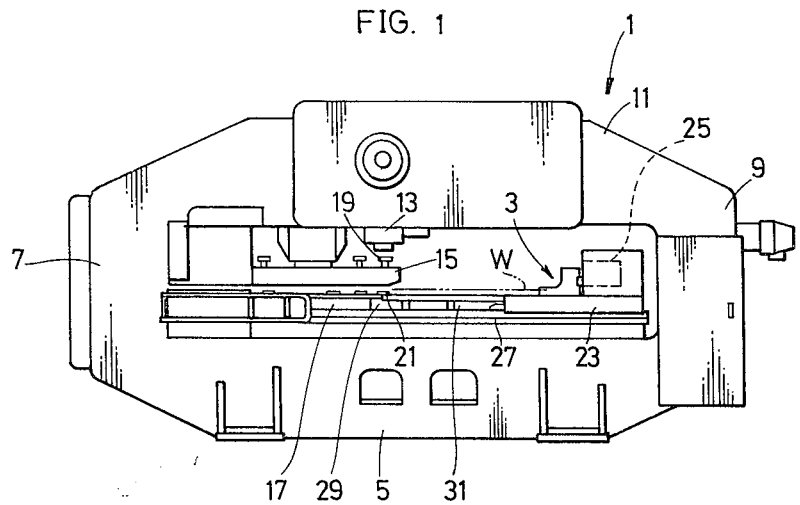
FIG. 1 is a front elevational view of a turret punch press which is provided with an apparatus embodying the principles of the present invention.

Referring to FIG. 1, a turret punch press generally designated by the numeral 1 is shown as having been equipped with a clamping apparatus 3 clamping a workpiece W to be processed according to the present invention for the purpose of describing the principles of the present invention. However, it is to be initially noted that the clamping apparatus 3 embodying the principles of the present invention can be incorporated into punch presses other than turret punch presses and other machine tools such as laser processing machines and drilling machines.

The turret punch press 1 is constructed of a base 5, a pair of side frames 7 and 9 vertically fixed or formed to the ends of the base 5 and an overhead frame 11 which is supported over the base 5 by the side frames 7 and 9. Also, the turret punch press 1 comprises a ram 13 and a pair of an upper turret 15 and a lower turret 17 holding a plurality of upper tools 19 and lower tools 21, respectively, which are varied in size and shape. The ram 13 is vertically movably mounted at the substantially midway portion of the overhead frame 11 to be vertically driven by power to act on the upper and lower tools 19 and 21 placed therebeneath. The upper turret 15 is so mounted as to rotatably hang from the overhead frame 11 with its shaft vertical to rotate partially beneath the ram 13, while the lower turret 17 is rotatably mounted on the base 5 just beneath the upper turret 15 in a coaxial relation therewith. Also, the upper and lower turrets 15 and 17 are so arranged that pairs of the upper and lower tools 19 and 21 common in size and shape vertically align with each other, and in this arrangement they are simultaneously driven by power to bring a desired pair of the upper and lower tools 19 and 21 into position beneath the ram 13. In this connection, forming tools can be mounted on the upper and lower turrets 15 and 17 as the upper and lower tools 19 and 21 more or less move in the same manner as punching tools to form a variety of shapes such as flanges and louvers on the workpiece W, although the turret punch press 1 is used mainly to punch holes as its name implies.

In order to feed and position the workpiece W to be punched, the turret punch press 1 is provided with a first carriage 23 which is movable toward and away from the upper and lower turrets 15 and 17 and a second carriage 25 which is slidably mounted on the first carriage 23 and holds the clamping apparatus 3 clamping the workpiece W. The first carriage 23 is slidably mounted on rails 27 which are fixed on the upper portion of the base 5 so that the first carriage 23 may be horizontally moved toward and away from the upper and lower turrets 15 and 17 when driven by power. The second carriage 25 holding the clamping apparatus 3 is mounted on the first carriage 23 so that the second carriage 25 may be horizontally moved by power in all directions at right angles with the rails 27. The clamping apparatus 3 for clamping the workpiece W is usually a pair in number but may be more than two, and they are detachably and adjustably fixed to the second carriage 25 so that they may be adjusted in horizontal position on the second carriage 25 according to the width of the workpiece W. Also, a fixed table 29 is provided on the base 5 so that the workpiece W can be slided thereon, and furthermore a pair of movable tables 31 may be fixed to the first carriage 23 to hold the extending ends of the workpiece W.

In the above described arrangement, the workpiece W which is gripped by the clamping apparatus 3 can be fed into position between the upper and lower turrets 15 and 17 and positioned just beneath the ram 13 by moving the first and second carriages 23 and 25. Before or as soon as the workpiece W is positioned between the upper and lower turrets 15 and 17 just beneath the ram 13, a desired pair of the upper and lower tools 19 and 21 are placed just beneath the ram 13 by the upper and lower turrets 15 and 17, and thus the workpiece W is punched or formed by the upper and lower tools 19 and 21 when the ram 13 is lowered to press the upper tool 19. Also, a number of holes varied in size and shape are automatically and continuously punched and formed in the workpiece W by rotating the upper and lower turrets 15 and 17 and moving the first and second carriages 23 and 25 under a numerical control which is preprogrammed. Furthermore, elongate holes and elongate shapes such as flanges and louvers can be punched and formed in the workpiece W by continuously feeding the workpiece W little by little into a single pair of the upper tools 19 and lower tools 21 being continuously stroked by the ram 13.

Figure 2:
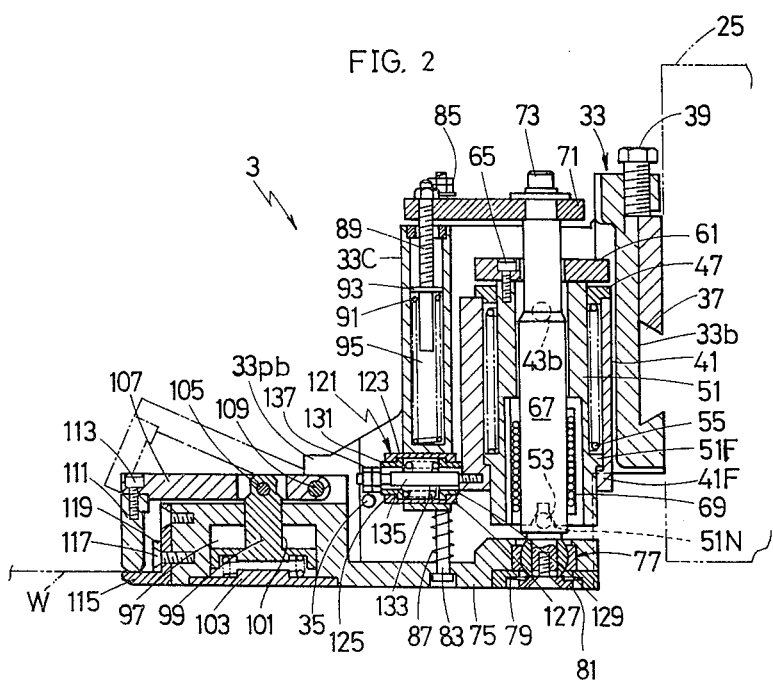
FIG. 2 is a sectional view of the apparatus embodying the principles of the present invention and shows the apparatus as mounted on the turret punch press shown in FIG. 1 together with portions thereof and is taken along the line II—II of FIG. 3.
Figure 3:
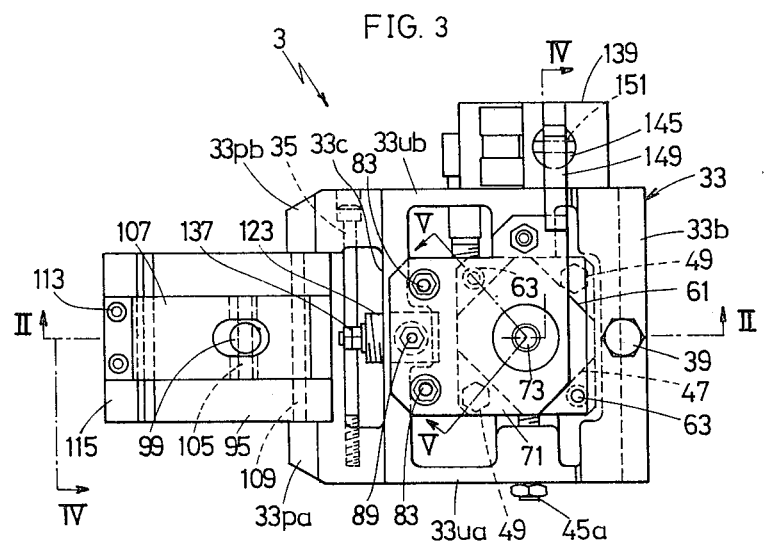
FIG. 3 is a plan view of the apparatus shown in FIG. 2.
Figure 4:
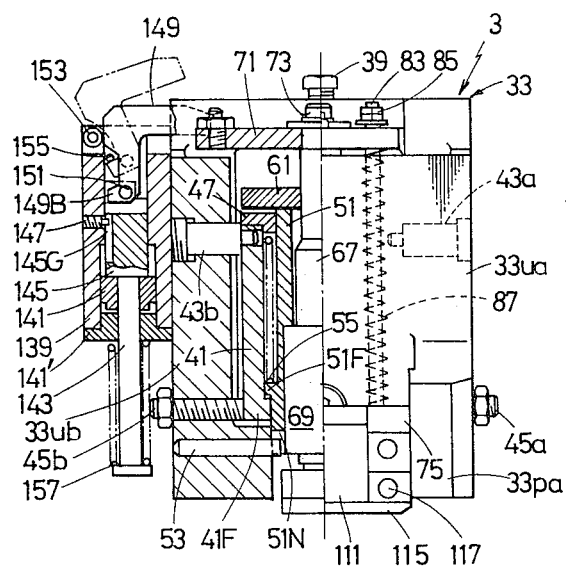
FIG. 4 is an elevational view of the apparatus shown in FIG. 2 and 3 and is shown partially in section taken along the line IV—IV of FIG. 3.

Referring to FIGS. 2, 3 and 4, the clamping apparatus 3 according to the present invention is constructed of a box-like frame 33 which has a back wall 33b, a pair of upright walls 33Ua and 33Ub having projections 33Pa and 33Pb, respectively, and a connecting wall 33c and has openings at its top and bottom. The back wall 33b is vertically connected to the second carriage 25, the upright walls 33Ua and 33Ub are connected to the back walls 33b in parallel with each other, and the connecting wall 33c is connected to the ends of the upright walls 33Ua and 33Ub in such a manner as to provide an opening just beneath itself. Also, the projections 33Pa and 33Pb are integrally formed at the lower ends of the upright walls 33Ua and 33Ub, respectively, to project outwardly in parallel with each other, and they are connected with each other by a tie rod 35 in the preferred embodiment. The frame 33 of the above described arrangement is detachably and adjustably fixed to the second carriage 25 so that the clamping apparatus 3 may be horizontally adjusted in its entirety in position with regard to the second carriage 25. In the preferred embodiment, the frame 33 is slidably connected by its back wall 33b to the second carriage 25 by means of a dovetail arrangment 37 and is so designed as to be detachably and adjustably fixed to the second carriage 25 by a bolt 39. In this connection, the clamping apparatuses 3, which will be more than two, are adjustably fixed to the second carriage 25 to be adjusted in their space from each other according to the width of the workpiece W to be clamped for processing.

In the interior of the box-like frame 33, there is provided a rocking sleeve member 41 which is square externally in the preferred embodiment but has a cylindrical interior bore and is formed at its interior lower end with a flange-like shoulder 41F. The rocking sleeve member 41 is pivotally supported by a pair of pins 43a and 43b which are horizontally fixed to the inner sides of the upright walls 33Ua and 33Ub, respectively, of the frame 33 in such a manner as to enable the rocking sleeve member 41 to rock from side to side in the frame 33. Also, the rocking sleeve member 41 is guided by a pair of screw members 45a and 45b which are horizontally adjustably extended inwards through the upright walls 33Ua and 33Ub, respectively, of the frame 33. Furthermore, the rocking sleeve member 41 is provided at its top end with a cap member 47 which is somewhat hexagonal in shape as seen from FIG. 3 and has a round opening for purposes which will be seen soon hereinafter. As best shown also in FIG. 3, the cap member 47 is fixed to the top end of the rocking sleeve member 41 by two bolts 49 at its opposite corners in the preferred embodiment. Although the rocking sleeve member 41 of the above described arrangement can rock in the frame 33, it is normally kept from rocking by a cylindrical member 51 which has an interior bore for a purpose to be seen hereinafter and is slidably included in the interior of the rocking sleeve member 41.

As best shown in FIG. 2, the cylindrical member 51 for keeping the rocking sleeve member 41 from rocking is slidably inserted in the rocking sleeve member 41 in such a manner as to upwardly project therefrom through the cap member 47. Also, the cylindrical member 51 is formed at its lower portion with a flange 51F and is further formed at its lowermost end with a pair of V-shaped notches 51N. The flange 51F of the cylindrical member 51 is so designed as to be stopped by the flange-like shoulder 41F of the rocking sleeve member 41 from lowering the cylindrical member 51. The V-shaped notches 51N of the cylindrical member 51 are so arranged as to engage with a pair of pins 53 horizontally fixed to the upright walls 33Ua and 33Ub of the frame 33 when the cylindrical member 51 is located at its lowermost position in the rocking sleeve member 41 with its flange 51F engaged with the flange-like shoulder 41F. Also, the cylindrical member 51 is kept biased downwardly by a helical spring 55 which is biased between the cap member 47 and the flange 51F of the cylindrical member 51 so as to bias the flange 51F to the flange-like shoulder 41F. Thus, the cylindrical member 51 is normally located at its lowermost position in the rocking sleeve member 41 with its notches 51N engaged with the pins 53, and therefore the rocking sleeve member 41 will be normally prevented from rocking about the pins 43a and 43b in the frame 33 by the pins 53 by means of the cylindrical member 51.

Figure 5:
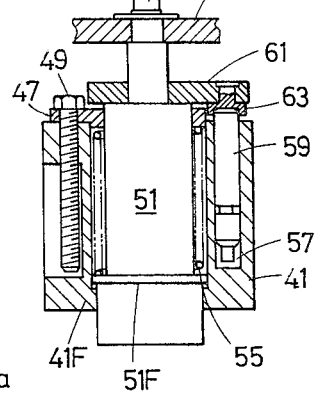
FIG. 5 is a sectional view taken along the line V—V of FIG. 3.

Referring to FIGS. 3 and 5, in order to raise the cylindrical member 51 against the spring 55, a plurality of cylinders 57 are vertically formed in the rocking sleeve member 41 in such a manner as to upwardly open and pistons 59 are slidably inserted in the cylinders 57. Also, a plate member 61 having piston receiving seats 63 is fixed to the top of the cylindrical member 51 by a plurality of bolts 65 in a manner such that the pistons 59 of the cylinders 57 will press the piston receiving seats 63 when the cylinders 57 are supplied with hydraulic or pneumatic fluid. As seen from FIG. 3, the plate member 61 is formed with a round opening for a purpose to be seen hereinafter, and it is somewhat hexagonal in shape so that the bolts 49 fixing the cap member 47 to the rocking sleeve member 41 may be projecting from the top of the cap member 47 in the preferred embodiment. In this connection, it will be now understood that the cap member 47 is also somewhat hexagonal to enable the pistons 59 to project out of the cylinders 57 to press the plate member 61. Thus, the cylindrical member 51 will be raised against the spring 55 by the pistons 59 by means of the piston receiving seats 63 and the plate member 61 when the cylinders 57 are supplied with hydraulic or pneumatic pressure fluid overcoming the spring 55. Accordingly, it will be understood that the V-shaped notches 51N of the cylindrical member 51 will be raised out of engagement of the pins 53 to enable the rocking sleeve member 41 to rock about the pins 43a and 43b in the frame 33, when the cylinders 57 are supplied with hydraulic or pneumatic pressure fluid overcoming the spring 55.

As best shown in FIGS. 2 and 4, a rod member 67 is slidably inserted in the cylindrical member 51 in such a manner as to project therefrom upwardly through the plate member 61 and also project downwardly from the lower end of the cylindrical member 51. In the preferred embodiment, the rod member 67 is guided by a ball bush assembly 69 which is fixedly inserted in the cylindrical member 51 so that it may smoothly slide therein. The rod member 67 is provided at its top end with a plate member 71 which is fixed thereto by a bolt 73 at the right angle thereto to extend in the direction away from the second carriage 25. Also, the rod member 67 is provided at its lower end with a swinging holding member 75 which is pivotally connected thereto by a spherical bearing means 77 in such a manner as to extend in the direction away from the second carriage 25. In the preferred embodiment, the spherical bearing means 77 is fixed to the lower end of the rod member 67 by means of a disk spring 79 and a washer 81 so that backlashes therearound may be eliminated. Furthermore, the swinging holding member 75 is held and stopped from downwardly swinging by a plurality of elongate rod members 83 which are connected to the plate member 71 and are held by nuts 85. The elongate rod members 83 are so arranged as to loosely extend through the swinging holding member 75 and the plate member 71 and are provided with helical springs 87 biasing the swinging holding member 75 and the plate member 71 away from each other.

In the above described arrangement, the swinging holding member 75 is held and stopped from downwardly swinging by the elongate rod members 83 but it can be resiliently upwardly swung around the spherical bearing means 77 when swung by a force overcoming the helical springs 87. Also, the swinging holding member 75 will be resiliently vertically raised when the rod member 67 is raised in the cylindrical member 51, and furthermore it will be rocked by the rocking sleeve member 41 about the pins 43a and 43b when the cylindrical member 51 is raised to bring up the V-shaped notches 51N out of engagement with the pins 53.

As best shown in FIGS. 2 and 3, in order to adjustably hold the swinging holding member 75 together with the rod member 67, an adjusting screw 89 is adjustably provided at the end of the plate member 71 just above the connecting wall 33C of the frame 33. The adjusting screw 89 is resiliently supported by helical spring 91 by means of a holding member 93 in a bore 95 which is vertically formed at the central portion of the connecting wall 33C of the frame 33. Thus, the swinging holding member 75 is resiliently supported together with the rod member 67 by the spring 91 through the holding member 93, the adjusting screw 89 and the plate member 71, in such a manner as to be decreased in weight to resiliently move up and down. Of course, it will be readily understood that the height of the swinging holding member 75 can be adjusted by rotating the adjusting screw 89.

As best shown in FIG. 2, in order to clamp the workpiece W to be processed, the swinging holding member 75 is provided with hydraulic or pneumatic cylinder 97 which has a piston 99 having piston rod 103 upwardly projecting therefrom and is covered by cap member 101 at its bottom. The piston rod 101 of the cylinder 97 is pivotally connected by a pin 105 to a lever member 107 which is pivotally connected to a portion of the cylinder 97 by a pin 109 and is provided at its free end with an upper clamping jaw 111 fixed thereto by a bolt 113. Also, a lower clamping jaw 115 is fixed by bolts 117 to the cylinder 97 together with a stopping member 119 for the workpiece W so as to cooperate with the upper clamping jaw 111 to clamp the workpiece W. Thus, it will be readily understood that the upper and lower clamping jaws 111 and 115 will clamp the workpiece W when the cylinder 97 is supplied with hydraulic or pneumatic fluid to enable the piston 99 and the piston rod 101 to downwardly pull the lever member 107.

As best shown in FIG. 2, in order to return the rocking sleeve member 41 to its normal position after its rocking, a centering means 121 is provided at the connecting wall 33C of the frame 33. The centering means 121 comprises a cylindrical casing 123 which is open at its ends and is horizontally placed in a bore formed through the connecting wall 33C of the frame 33 so as to open toward the rocking sleeve member 41. The cylindrical casing 123 is provided at its ends with opposite inner flanges 125 and 127 and includes a pair of flanged bushes 129 and 131 which are slidably inserted therein and are biased by a helical spring 133 away from each other toward the flanges 125 and 127, respectively. The centering means 121 comprises further a stud bolt 135 which is extended through the cylindrical casing 123 and is fixedly connected at its end to the rocking sleeve member 41. The centering means 121 is also provided at its other end with nuts 137. In this arrangement, the flanged bush 129 is kept biased by the spring 133 toward the rocking sleeve member 41, and the flanged bush 131 is kept biased by the spring 133 toward the nuts 137. Thus, it will be understood that the rocking sleeve member 41 will be returned to its original position by the spring 133 through the stud bolt 135 after it is rocked.

As shown in FIG. 4, a hydraulic or pneumatic cylinder 139, which is upwardly open and is covered by a cap member 141' at its bottom, is vertically fixed to the outside of the upright wall 33Ub of the frame 33. The cylinder 139 includes a piston 141 which has an elongate piston rod 143 downwardly projecting through the cap member 141' and is provided at its top with a guiding member 145 having a groove 145G. The guiding member 145 is stopped from rotating in the cylinder 139 by a stopping member 147 and is provided at its top portion with a hook member 149 which is pivotally connected thereto by a pin 151 and has a bell crank projection 149B. The hook member 149 is so arranged as to be pressed to the plate member 71 by a cam roller 153 rotatably provided at the cylinder 139 when it is pulled downwardly by the piston 141 and the guiding member 145. The hook member 149 is further so arranged as to be swung up away from the plate member 71 when it is raised by the piston 141 and the guiding member 145 to bring up the bell crank projection 149B into contact with a pin 155 provided at the cylinder 139. Also, the piston rod 143 is kept biased downwardly by a helical spring 157 to normally keep the hook member 149 pulled downwardly by both the piston 141 and the guiding member 145 so as to press the plate member 71 downwardly. In this arrangement, the plate member 71 is normally kept pressed downwardly by the helical spring 157 by the hook member 149 so as to keep the upper and lower clamping jaws 111 and 115 at a lower position, and the hook member 149 is raised to raise the upper and lower clamping jaws 111 and 115 when the cylinder 139 is supplied with hydraulic or pneumatic fluid to raise the piston 141. Thus, the upper and lower clamping jaws 111 and 115 are kept lowered to grip the end of the workpiece W bending down before they clamp the workpiece W, and they are raised when feeding the workpiece W.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:
1. A workpiece claiming apparatus (3) for machine tools comprising:
   a. a frame (33);
   b. a rocking sleeve member (41), rockably fixed to the frame (33);
   c. a cylindrical member (51), slidably inserted in the rocking sleeve member (41), so as to move therein;
   d. a rod member (67), inserted in the cylindrical member(51), so as to project therefrom;
   e. a swinging holding member (75), rockably provided at one end of the rod member (67); and
   f. an upper clamping jaw means (111) and a lower clamping jaw means (115), both connected to the swinging holding member (75), for gripping an end of a workpiece (W).

2. The clamping apparatus (3), according to claim 1, further comprising:

g. a centering means (121), provided at the frame (33), for returning the rocking sleeve member (41) to its normal position after rocking.

* * * * *

UNITED STATES PATENT AND TRADEMARK OFFICE
CERTIFICATE OF CORRECTION

PATENT NO. : 4,422,628
DATED : December 27, 1983
INVENTOR(S) : Shigeo Kasai

It is certified that error appears in the above—identified patent and that said Letters Patent is hereby corrected as shown below:

IN THE CLAIMS:

Claim 1, line 1, "claiming" should read --clamping--.

Signed and Sealed this

Thirty-first Day of July 1984

[SEAL]

Attest:

GERALD J. MOSSINGHOFF

Attesting Officer — Commissioner of Patents and Trademarks